Patented Aug. 12, 1941

2,252,522

UNITED STATES PATENT OFFICE 2,252,522

METHOD OF MAKING CELLULOSE ETHER VARNISHES

Norman R. Peterson and Joseph L Sherk, Midland, Mich., assignors to The Dow Chemical Company, Midland, Mich., a corporation of Michigan No Drawing. Application August 30, 1939, Serial No. 292,687

10 Claims. (Cl. 106—172)

This invention relates to oleo resinous varnishes comprising cellulose ethers and is particularly concerned with the method whereby such varnishes may be prepared.

Bucy has described in U. S. Patent No. 2,148,601 a procedure for incorporating cellulose ethers in oleo resinous varnishes. His method is applicable primarily to the preparation of varnishes of short oil length. Hereinafter the term "oil length" of a varnish will be employed in the conventional manner as a definition of the number of gallons of oil present in the varnish for each 100 pounds of resin therein. The procedure described in the aforesaid U. S. Letters Patent consists essentially of two steps: first, reacting an oil resin mixture at elevated temperature; and second, dissolving an organo-soluble cellulose ether in the so-reacted mixture with the aid of heat. As the method is described, the drying oil-resin mixture is held at a high temperature of, for example, 500° F. or more for sufficient time to allow of reaction between the oil and the resin. While the oil and resin are being heated to effect the reaction, there occurs an appreciable amount of bodying or thickening of the oil, which is especially pronounced in the case of easily polymerizable drying oils, such as tung oil, oiticica oil, and dehydrated castor oil. The extent of the bodying by heat must be controlled, since this reaction, if allowed to proceed too far, makes difficult or prevents subsequent solution of a cellulose ether in the bodied oil-resin mixture, especially when these mixtures comprise a large proportion of oil. Thus it is taught that to avoid incompatibility of the cellulose ether the oil-resin mixture must not be heated too long, and it must not contain more than about 40 per cent of its weight of drying oil. The proportions recited in the aforesaid patent will form varnishes of oil length less than about 20, and with most oils and resins the varnishes will have an oil length less than about 12. Such varnishes have limited fields of application. For many uses it is desirable to have varnishes of long oil lengths; i. e. lengths up to 75 gallons or more of oil per 100 pounds of resin. In medium and long oil varnishes, the ratio of resin to oil is too low to permit the resin to serve in the capacity of a blending agent for the oil and cellulose ether, as it does in short oil varnishes.

Generally speaking, a short oil varnish contains from 6 to 15 gallons of oil per 100 pounds of resin and is useful as a rubbing varnish, for example, for use in furniture coating. Varnishes of 15 to 30 gallon lengths are of primary value as floor varnishes and may be designated as medium length varnishes. Varnish compositions of oil length from 30 to 75 gallons or more may be designated as long oil varnishes and are useful primarily as water-proofing coatings, outdoor varnishes, and the like. Such compositions include the customary water-proofing spar varnishes which do not, however, contain cellulose ether. A cellulose ether varnish of any oil length may be used in making enamels, and the long oil varnishes can make good printing inks.

It is accordingly among the objects of the invention to provide a method whereby varnishes comprising organo-soluble cellulose ethers and of any desired oil length may be obtained. Another object is to provide a method whereby long oil varnishes may be obtained comprising cellulose ethers. A further object is to provide a method whereby homogeneous blends of drying oil, varnish resin, and organo-soluble cellulose ether may be obtained after only a short period of cooking, which compositions form clearly stable solutions with hydrocarbon thinners. Yet another object is to provide a method whereby oleo resinous varnishes containing cellulose ethers may be prepared which are miscible with varnish thinners to form clear solutions of high solids content and low viscosity.

According to the invention the above and related objects are attained by cooking oleo resinous varnishes comprising organo-soluble cellulose ethers in the presence of a minor proportion of a zinc compound which will dissolve in the varnish cook during the heating period. The zinc compounds which are suitable for this use include zinc oxide, zinc salts of the resin acids, such as zinc rosinate, zinc salts of fatty acids, such as zinc acetate or zinc stearate, the zinc salts of naphthenic acids, and zinc carbonate. The amount of zinc compound employed for the purpose may vary from 0.01 to 0.3 per cent and preferably from 0.05 to 0.2 per cent, calculated as metallic zinc and based on the weight of the oil.

In general, the varnish cook is made by first heating together the resin and oil constituents and the cellulose ether is later added to the hot mixture. The zinc compound may be added to the oil-resin mixture prior to heating or on the "up heat" or it may be added at the same time as the cellulose ether. The compound of zinc appears to catalyze the reaction between the oil and the resin as well as the reaction between these materials and the cellulose ether, and produces a varnish blend which is miscible with the customary hydrocarbon thinners, and especially those thinners which contain a minor proportion of aromatics. In the case of short oil varnishes, the zinc compound accelerates the reaction, making possible the preparation of a varnish in a shorter time than when no zinc compound is present. When preparing medium or long oil varnishes comprising cellulose ethers, the zinc compound makes possible the use of a much larger proportion of oil, and, hence, leads to the preparation of a type of varnish not heretofore attainable containing a cellulose ether.

As is usual in the varnish making art, there cannot be set down a generalized cooking schedule applicable to all varnishes of a class with any precision. The conditions used in the cook are varied according to the nature and amount of resin used, the type of oil and other ingredients each modifying the cooking schedule. Since the variant are in general understood by skilled varnish makers, an attempt will be made here to outline a range of working conditions applicable to the preparation of the cellulose ether varnishes, according to the invention. The oil and varnish resin are mixed and heated to a solution temperature between 400° and 600° F., depending on the resin. Heating is generally effected at a rate of 10 Fahrenheit degrees per minute, although faster or slower heating may be used. After the resin has dissolved in, or reacted with the oil to form a homogeneous mixture, the heating is continued at a gas-proofing temperature between 450° and 580° F., especially when tung oil is used, for a minimum gas-proofing effect. When cellulose ether varnishes are to be made, gas-proofing is continued only about half as long as with similar compositions which are to contain no cellulose ether. After the brief gas-proofing, the cook is chilled back, if necessary, to about 470° to 525° F., suitably by addition of more oil which has been reserved for the purpose. The cellulose ether is added portionwise and with stirring while the cook is in or near this temperature range, and then held at a temperature above 400° F. and preferably at 420° to 500° F. for a few minutes (usually 5 to 20 minutes) to control the viscosity of the cook and to improve its ultimate solubility in hydrocarbon thinners. The longer the "hold," the lower is the viscosity and the greater the tolerance to thinners. When the cellulose ether has become dissolved and the cooking continued long enough to give the desired viscosity and tolerance properties and at least until a drop withdrawn and cooled on a test plate is perfectly clear, haze-free, and miscible with thinner, the thinner is added at as high temperature as practical which may be 450° F. or lower. The thinned varnish is cooled and a drier added. The zinc compound employed as catalyst is added at any stage prior to or concurrently with the addition of the cellulose ether. At no point in the cook is any mutual solvent for oil, resin and cellulose ether employed other than these ingredients themselves and the zinc compound catalyst.

The use of lead catalysts for the present purposes is described in our concurrently filed U. E. patent application Serial No. 292,686. The new compositions producible using lead or zinc catalysts during the cook are claimed in the said co-filed application.

The zinc compound employed as catalyst delays the bodying of the oil during the cooking operation, even when large proportions of oil to resin are employed. The time required to make an oil-resin mixture compatible with a cellulose ether (i. e. the time between additions of cellulose ether and thinner) is reduced by at least 50 per cent when using the herein described catalyst as contrasted with the time required at the corresponding stage to produce a like composition when making short oil varnishes without the zinc catalyst. The most important advantage of the present invention is believed to be the adaptability of the herein described method to the preparation of medium and long oil varnishes comprising cellulose ethers and such easily polymerized oils as tung, oiticica and dehydrated castor oil. While the use of the zinc compound permits of the preparation of varnish compositions in relatively short time, it has been found that longer cooking times do not impair the compatibility of the ethyl cellulose and the oil-resin cook. The present method makes possible the preparation of a wide variety of types of varnishes under rather broad conditions of operation.

Varnish compositions which may be prepared according to the method of the invention may contain from 1 to 25 per cent of a cellulose ether, from 15 to 80 per cent of a drying or semi-drying oil, and from 15 to 80 per cent of a resin. It may also contain such common addition agents as pigments, metallic soaps, driers, and the like.

Among the organo-soluble cellulose ethers that may be used in the herein described method to provide the new compositions are ethyl cellulose, propyl cellulose, butyl cellulose, benzyl cellulose, or mixed ethers such as ethyl propyl cellulose, ethyl butyl cellulose, and the like. As to the physical nature of the cellulose ether employed, should be of the organo-soluble type and may be of any viscosity grade, although for the preparation of low viscosity compositions of high solids content it is preferred to use a low viscosity type of cellulose ether. Regardless of the viscosity characteristics of the cellulose ether employed, it is not desirable in most cases to use more than 25 per cent of the cellulose ether, based on the total weight of non-volatile solids in the varnish composition, since the viscosity of the varnish increases rapidly as the amount of cellulose ether is increased.

Any of the oil-soluble varnish resins may be used as the resin ingredient in the composition, and for our present purposes the term "oil-soluble varnish resins" is intended to designate resins which are either initially soluble in varnish oils or which become soluble therein during the cooking operation, possibly only after the addition of the zinc compound employed as a catalyst. A list of a few of the types of suitable resins and at least one example of specific resins falling under each type is given in the following table. The said list is merely illustrative of the wide variety of types of resins which may be used, and accordingly should not be construed as limiting the invention.

| Resin type | Commercial name |
| --- | --- |
| Pure phenolic | BR 254<br>BR 1329<br>BR 3360<br>BR 4036<br>Beckacite 1001<br>Durez 202 |
| Oil modified phenolic | XR 3342<br>BR 302<br>Durez 210 |
| Coumarone indene | Cumar W2½ |
| Run copal | Kopol 502 |
| Ester gum | Ester gum |
| Phenol modified natural resin | Phenac 615<br>Beckopol 1400 |
| Resin acid modified alkyd | Rezyl 408 |

There may be used any drying, semi-drying oil or non-drying oil of the glyceride type as the oil ingredient of the compositions preparable according to the present method. Examples of such oils in common use, each of which may be employed, include tung oil, linseed oil, dehydrated castor oil, oiticica oil, fish oil, soya bean oil, perilla oil, corn oil, cottonseed oil, sesame oil, and the like.

The compositions made by the cooking process of the present invention may be thinned with hydrocarbon solvents or customary varnish thinners and particularly with those which contain only a minor proportion of aromatic hydrocarbons. Suitable thinners may be prepared by adding a minor quantity of an aromatic hydrocarbon, such as xylene or toluene to a thinner of a wholly aliphatic character, such as the customary mineral spirits. Alternatively the hydrogenated naphthas and the aromatic naphthas or "high solvency naphthas" may be used since these consist of mixtures of aliphatic hydrocarbons and aromatics. The high solvency naphthas may be diluted with purely aliphatic thinners to obtain suitable thinners for use with the present compositions, for example, the hydrogenated naphthas and their chemical equivalents, known commercially under the names, Solvesso, Solvsol, Union Aromatic Solvent, Shell Solvent T. S., and the like, when mixed with equal volumes of mineral spirits, are thinners miscible with the varnish compositions of the present invention. It is to be understood that the cellulose ether is completely dissolved in the oil resin mixture prior to the addition of any thinner or volatile varnish component. Hence, the use of aromatic hydrocarbons or other thinners which are capable of dissolving cellulose ethers is not the equivalent of the "cold cut" method of preparing cellulose ether varnishes disclosed in the prior art. If desired, solvents of the ester, ketone, or alcohol type may be added to the thinner employed, but in general their use is not to be recommended where several coats of varnish are to be applied, one over the other, since these active solvents tend to lift previously applied coats. The amount of thinner added to the cooked composition is preferably such that the final coating composition contains between about 20 and 90, and preferably between 40 and 60 per cent of solids by weight. The expression "solids" is here used in its customary varnish meaning to designate the oil, resin and cellulose ether, none of which are volatile under the customary conditions of application and use. Compositions containing from 40 to 60 per cent of solids and correspondingly from 60 to 40 per cent of thinner have sufficiently low viscosity for all of the usual uses to which varnishes are put. The viscosity of the thinned composition having a solids content in the said range is ordinarily from about 0.5 to 2.5 poises. This is a remarkably low viscosity range for a coating composition having as high solids content as that just indicated.

The invention may be better understood by reference to the following examples which are given merely by way of illustration and are not to be construed as limiting:

*Example 1*

Preparation of a long oil varnish. The following varnish ingredients were mixed and heated to 565° F. in the course of 30 minutes:

| | Parts by weight |
|---|---|
| Bakelite resin BR 1329 | 6 |
| Zirex (zinced rosin containing 9.6% zinc) | 2 |
| Raw tung oil | 50 |
| Linseed oil | 12 |

The source of heat was removed and the temperature of the cook ceased rising at about 580° F. There was then added 10 parts by weight of cumar resin W 2½, and the cook was stirred until the resin dissolved. 12 parts of a bodied linseed oil, having a viscosity of 4.35 poises was added and the mixture was allowed to cool to 470° F. at which temperature there was added 8 parts by weight of ethyl cellulose of a low viscosity type and having an ethoxyl content of 48.5 per cent. The ethyl cellulose was added portion-wise with stirring and the temperature allowed to drop to 420° F., at which time the varnish cook was thinned with its own weight of a thinner composed of 50 parts of Union Aromatic Solvent No. 30 and 50 parts of mineral spirits. Cobalt naphthenate in an amount equivalent of 0.05 per cent of cobalt based on the weight of oil present was added to the varnish. The final varnish product had a viscosity of 0.65 poise, retained its ingredients in uniform solution and gave an excellent finish when applied as a coating composition.

By way of contrast, a varnish cooked in the same way and containing the same ingredients, except that no zinc compound was employed, was found to be unstable. The ethyl cellulose precipitated out from the composition on cooling.

*Example 2*

Preparation of varnish of intermediate (about 25 gallons) oil length. The following varnish ingredients were employed in the preparation of an intermediate oil length varnish:

| | Parts by weight | Percent |
|---|---|---|
| Durez 210 resin | 666.6 | 30.6 |
| Heat bodied linseed oil | 266.6 | 12.4 |
| Raw tung oil | 1066.6 | 49 |
| Ethyl cellulose, 9 centipoise, 48.5% ethoxy | 173.2 | 8 |
| Zinc acetate | 10 | |

The resin and tung oil were heated at a uniform rate in a varnish kettle to attain a temperature of 565° F. in about 30 minutes. The fire was extinguished and half of the linseed oil was added, followed by the zinc acetate and the balance of the linseed oil. The composition was cooled to about 500° F., at which temperature the ethyl cellulose was added with stirring. In 4.5 minutes the temperature had dropped to 460° F. where it was held for 5 minutes and then allowed to drop further. The cook was thinned with an equal volume mixture of its own weight of hydrogenated petroleum naphtha and mineral spirits, forming a solution of 0.85 poise viscosity. The product was clear and homogeneous and was useful wherever intermediate length varnishes are employed.

A varnish was made for purposes of comparison containing the same ingredients with the exception of zinc acetate, and the cooking schedule employed was identical with that described. The product was cloudy even while hot and the ethyl cellulose precipitated out on cooling prior to the addition of the thinner. Precipitation of the ethyl cellulose was completed by the addition of thinner inasmuch as the thinner employed is a non-solvent for ethyl cellulose.

*Example 3*

Preparation of varnish of approximately 32 gallon length. The ingredients employed in the preparation of a 32 gallon varnish were as follows:

| | Parts by weight |
|---|---|
| Raw tung oil | 56.12 |
| Raw alkali refined perilla oil | 10.11 |
| Durez 210 | 21.48 |
| Durez 500* | 3.79 |
| Ethyl cellulose, low viscosity, standard ethoxy | 8.0 |
| Zirex (9.6% zinc) | 5.0 |

*Durez 500 is described by Gardner, "Physical and Chemical Examination of Paints, Varnishes, Lacquers and Colors," Institute of Paint and Varnish Research, Washington, D. C., ed. 8, (1937), page 1466, as 100% pure phenolic resin, soluble in aromatic hydrocarbons and all commonly used diluents and solvents, particularly suited where greater durability and adhesion are required.

The tung oil and the Durez resins were heated together with the Zirex at 550° F. in the course of 35 minutes. The fire was pulled and the perilla oil added, after which the batch was allowed to cool to 490 F. At this temperature, the ethyl cellulose was stirred in, the temperature being maintained until the ethyl cellulose had dissolved in the course of about 5 minutes. Cooling was continued down to 450° F., which temperature was maintained for about 7 minutes, after which the cook was thinned with its own weight of an equal volume mixture of a hydrogenated petroleum naphtha and mineral spirits. The finished varnish contained 50 per cent solids and had a viscosity at room temperature of 1.1 poises. Cobalt naphthenate in amount equivalent of 0.05 per cent by weight of cobalt based on the total varnish solids was added and the varnish was ready for use. This composition was found to be a useful vehicle for aluminum pigment and when so used gave a durable hard coating on exterior steelwork.

*Example 4*

The preparation of 25 gallon varnish. The ingredients employed are:

| | |
|---|---|
| Ester gum | 31.35 parts by weight |
| Raw tung oil | 50.1 parts by weight |
| Heat bodied linseed oil (4.35 poises) | 12.55 parts by weight |
| Ethyl cellulose | 6.0 parts by weight |
| Litharge | 1% of the weight of oil |
| Zirex | 1% of the weight of oil |

The ester gum, Zirex and tung oil were heated to 400° F. in the course of 20 minutes. The litharge was added at this point and heating continued to 550° F. in the course of 15 minutes additional. The flame was removed and the tempertaure continued to rise to about 565° F. After 3 minutes at this temperature, linseed oil was added, cooling the batch to 515° F. It was allowed to cool further to 480° F. which required about 12 minutes more. At the latter temperature, the ethyl cellulose was added with stirring which cooled the composition to about 450° F. where the temperature was maintained for 11 minutes, after which it was thinned to 50 per cent solids consistency with an equal volume mixture of Union Aromatic Solvent No. 30 and mineral spirits. A drier equivalent to 0.05 per cent of cobalt based on the weight of oil was added. The varnish composition had a viscosity of 1.3 poises at 25° C.

*Example 5*

Short oil varnishes of about 8 gallons length were made employing the same ingredients in the same proportions by weight, one of the cooks having catalytic amounts of zinced rosin present, the other having no zinc compound.

| | |
|---|---|
| Phenac 615 | 41.9 per cent |
| Ester gum | 14.0 per cent |
| Raw China-wood oil | 35.0 per cent |
| Ethyl cellulose | 9.0 per cent |
| Zirex | 1.0 per cent of the total weight of solid ingredients |
| Total weight | 2000 grams |

The phenac, ester gum, China-wood oil and Zirex were heated to 530° F. in 45 minutes and held at that temperature for 3 minutes. The ethyl cellulose was added with stirring and the hot mixture cooled to 460° F. in the course of 14 minutes. 5 cc. of Cobalt Nuodex (cobalt naphthenate) was added with stirring to serve as a drier. The mixture was cooled to 400° F. in the course of 10 minutes and thinned to 45 per cent solids concentration with an equal volume mixture of mineral spirits and Union Aromatic Solvent No. 30. The varnish had a viscosity of 0.85 poise.

The batch made for purposes of comparison but containing no Zirex or other catalyst was prepared employing an identical cooking schedule and was thinned to 45 per cent solids concentration with the same thinner. This varnish had a viscosity of 1.4 poises.

We claim:

1. The method which comprises cooking together a mixture consisting essentially of from 15 to 80 per cent of an oil of the glyceride type and an oil-soluble resin at a solution temperature between 400° and 600° F., adding to the mixture from 1 to 25 per cent of an organo-soluble cellulose ether, and a zinc compound soluble in the varnish cook; the zinc compound being capable of accelerating, and being employed in amount sufficient to accelerate the reactions among the oil, resin, and cellulose ether components, and to make the cellulose ether compatible with the other components in the absence of a mutual solvent; and continuing the cooking at a temperature above 400° F. at which the cellulose ether dissolves in the mixture until the cellulose ether is dissolved, thereby to produce a cooked oleo-resinous cellulose ether varnish which is miscible to form clear solutions with predominantly aliphatic hydrocarbon thinners containing only minor amounts of aromatics, irrespective of the oil length of the said cooked varnish.

2. The method as claimed in claim 1 wherein the zinc compound is employed in amount sufficient to contain from 0.01 to 0.3 per cent of zinc based on the weight of oil.

3. The method as claimed in claim 1 wherein the zinc compound is employed in amount sufficient to contain from 0.05 to 0.2 per cent of zinc based on the weight of oil.

4. The method which comprises cooking together a mixture consisting essentially of from 15 to 80 per cent of an oil of the glyceride type and an oil-soluble resin at a solution temperature between 400° and 600° F. until the mixture is homogeneous, continuing cooking at a gas-proofing temperature for about one-half the normal gas-proofing period, adding to the mixture from 1 to 25 per cent of an organo-soluble cellulose ether at a temperature above 400° F., maintaining a temperature above 400° F. until a sample withdrawn and cooled is clear, haze-free and miscible with predominantly aliphatic hydrocarbon thinners containing only minor amounts of aromatics, the cooking operation, at least after addition of the cellulose ether, being effected in the presence of a zinc compound soluble in the varnish cook, capable of accelerating and in amount sufficient to accelerate the reactions among the oil, resin, and cellulose ether components, and to make the cellulose ether compatible with the other components in the absence of mutual solvents.

5. The method as claimed in claim 1, wherein the zinc compound is a zinc rosin.

6. The method as claimed in claim 1, wherein the cellulose ether is ethyl cellulose.

7. The method as claimed in claim 4, wherein the cellulose ether is ethyl cellulose.

8. The method as claimed in claim 1, wherein the proportion of oil to resin is greater than 20 gallons of the former for each 100 pounds of the latter, thereby to prepare a medium or long oil varnish containing a cellulose ether, the said varnish being miscible with hydrocarbon thinners containing only minor amounts of aromatics to form clear solutions of low viscosity relative to solids content.

9. The method as claimed in claim 4, wherein the proportion of oil to resin is greater than 20 gallons of the former for each 100 pounds of the latter, thereby to prepare a medium or long oil varnish containing a cellulose ether, the said varnish being miscible with hydrocarbon thinners containing only minor amounts of aromatics to form clear solutions of low viscosity relative to solids content.

10. The method as claimed in claim 4, wherein at least part of the oil employed is a readily polymerized oil selected from the class consisting of tung oil, oiticica oil and dehydrated castor oil.

NORMAN R. PETERSON.
JOSEPH L. SHERK.